United States Patent
Rütschle

[11] Patent Number: 5,868,656
[45] Date of Patent: Feb. 9, 1999

[54] MACHINE TOOL HAVING A TOOL CHANGING DEVICE WITH LINEAR STROKE MECHANISM

[75] Inventor: Eugen Rütschle, Mühlheim, Germany

[73] Assignee: Chiron Werke GmbH & Co. KG, Germany

[21] Appl. No.: 778,131

[22] Filed: Jan. 2, 1997

[30] Foreign Application Priority Data

Jan. 3, 1996 [DE] Germany ................. 196 00 054.8

[51] Int. Cl.⁶ .................................................. B23Q 3/157
[52] U.S. Cl. ........................... 483/44; 483/30; 483/36; 483/37; 483/38; 483/39; 483/47; 483/50; 483/52
[58] Field of Search ................. 483/30, 36, 37, 483/38, 39, 44, 47, 50, 52

[56] References Cited

U.S. PATENT DOCUMENTS

| | | | |
|---|---|---|---|
| 3,587,873 | 6/1971 | Lohneis | 483/44 |
| 4,151,918 | 5/1979 | Nakane | 483/44 |
| 4,237,599 | 12/1980 | Buonauro et al. | 483/50 |
| 4,457,659 | 7/1984 | Watanabe | 483/44 |
| 4,571,813 | 2/1986 | Fukuoka et al. | 483/37 |
| 4,831,714 | 5/1989 | Babel et al. | 483/49 |
| 4,833,772 | 5/1989 | Kobayashi et al. | 483/44 |
| 5,081,762 | 1/1992 | Kin | 483/44 |

FOREIGN PATENT DOCUMENTS

| | | |
|---|---|---|
| 0 712 685 A | 5/1996 | European Pat. Off. . |
| 41 17 702 A1 | 12/1992 | Germany . |
| 43 00 745 A1 | 7/1994 | Germany . |
| 44 21 385 A1 | 1/1996 | Germany . |
| 2 255 734 | 11/1992 | United Kingdom . |
| WO 92 22400 A | 12/1992 | WIPO . |

OTHER PUBLICATIONS

English translation of German Abstract DE 41 17 702 A1.
English translation of German Abstract DE 43 00 745 A1.

*Primary Examiner*—Andrea L. Pitts
*Assistant Examiner*—Christopher Kirkman
*Attorney, Agent, or Firm*—Pretty, Schroeder & Poplawski

[57] ABSTRACT

A machine tool comprises a spindle having a tool receptacle for receiving tool holders in their working position. A tool changer is provided for conveying a tool holder in a first changing step between a magazine position and a spindle position at said spindle. Further provided is a linear stroke mechanism for conveying said tool holder in a second changing step between said spindle position and said working position. A common drive mechanism is linked to said tool changer and said linear stroke mechanism such as to affect both said first and second changing step.

15 Claims, 5 Drawing Sheets

MACHINE TOOL HAVING A TOOL CHANGING DEVICE WITH LINEAR STROKE MECHANISM

BACKGROUND OF THE INVENTION

1. Field of the Invention

The present invention relates to a machine tool having a spindle, a tool changer for conveying tool holders between a magazine position and a spindle position on the spindle, and a linear stroke mechanism for conveying a tool holder between the spindle position and a working position in a tool receptacle of the spindle.

2. Description of Related Prior Art

A machine tool of this kind is known from DE 44 21 385 A1.

In the known machine tool, the spindle is rotatably mounted in a spindle tube. The tool changer comprises two gripper arms for transporting the tool holders between the magazine position and the spindle position beneath the tool receptacle. A holding mechanism which carries the tool changer and serves to convey the respective tool holder from the spindle position into its working position in the tool receptacle is mounted on the spindle tube, displaceable longitudinally in a linear stroke motion. The holding mechanism is mounted rotatably on the spindle tube, about its longitudinal axis, in such a way that the gripper arms have a common transfer position with respect to the tool magazine.

A hydraulic piston-cylinder unit is provided to drive each of the two gripper arms. A further piston-cylinder unit is also provided for the rotary and linear stroke motions of the holding mechanism. A rotary mechanism ensures that under certain conditions, the holding mechanism is forced to rotate during the linear stroke motion.

Tool changes can be performed rapidly with this machine tool, but the design complexity is relatively high.

SUMMARY OF THE INVENTION

Proceeding therefrom, it is an object of the present invention to create a machine tool that makes available rapid tool changing times with little design complexity.

According to the invention, this object is achieved in the machine tool mentioned at the outset by the fact that a common drive mechanism is provided for the tool changer and the linear stroke mechanism.

The underlying object of the invention is completely achieved in this manner.

The feature of providing a single common drive mechanism for the tool changer and the linear stroke mechanism considerably reduces the overall design complexity of the machine tool. In contrast to the related art described above, in which a separate drive is provided in each case for conveying the tool holders between the magazine position and the spindle position on the one hand, and the spindle position and the working position on the other hand, according to the invention a single drive mechanism provides for both types of motion.

The common drive mechanism preferably has a motor having two output shafts, which are drive-coupled to a changer drive and a linear stroke drive of the common drive mechanism.

This feature results in an abandonment of the approach followed previously, that of accomplishing the tool holder motions by means of piston-cylinder units. Because of the positive power transfer of motors, this drive technology can meet the requirement of matching the changer motions and linear stroke motions to one another in particularly simple structural terms. If the motor is configured as a geared motor, different rotation speeds can be imparted to the changer drive on the one hand and the linear stroke drive on the other hand, which further simplifies matching between the two types of motion.

It is preferable in this connection if the changer drive and/or the linear stroke drive are configured as a changer drive train or linear stroke drive train, respectively.

With this feature is it particularly easy to take into account the circumstance that the forces necessary to initiate the changing operation on the one hand, and the linear stroke operation on the other hand, must be applied at completely different locations. The drive train or drives then provide for power transfer from the motor of the common drive mechanism to the respective locations at which the motor force is required.

According to a preferred embodiment, the changer drive train and the linear stroke drive train are matched to one another in such a way that changer motions and linear stroke motions directly follow one another.

Overall tool changing times can be substantially reduced with these features, since there are no non-productive times for the drive between the changer motions and the linear stroke motions. The positive nature of the drive mechanism consisting of motor and drive trains, which is inherent in the system, makes this requirement particularly easy to meet.

According to a further preferred embodiment, the common drive mechanism and the tool changer are arranged on a bracket that is movable parallel to the linear stroke direction.

With this feature, the linear stroke motions of the linear stroke mechanism can be obtained by means of linear stroke motions of the bracket. Because not only the tool changer but also the common drive mechanism are arranged on the bracket, the power transfer paths, in particular to the tool changer, are as short as possible. Although it would be conceivable to provide the common drive mechanism separately from the bracket, in this case the design complexity for the changer drive line would be greater.

Preferably the linear stroke drive of the common drive mechanism is mounted displaceably in the linear stroke direction on a spindle head, and is braced, for linear stroke motions, against the spindle head. Mounting and bracing can also be accomplished, rather than on the spindle head, on a machine element joined rigidly to it.

This has firstly the advantage that the drive line for the linear stroke drive is also short. Secondly, it advantageously guarantees that the bracket and the drive elements arranged on it "participate" in all the motions of the spindle head. This is especially advantageous if the machine tool is of a type in which the spindle head is moved in the X, Y, and Z directions relative to the workpiece being machined.

It is advantageous in this connection if the bracket is braced in spring-compensated fashion against the spindle head.

With this feature it is possible to reduce substantially the forces acting on the linear stroke drive, which is inherently subjected to the entire weight of the bracket and the drive elements arranged on it.

According to a preferred embodiment, the linear stroke drive train of the common drive mechanism has a crank, with a crank pin, joined nonrotatably to the associated output shaft of the motor; a toothed slider bar having two slots into which the crank pin alternatively engages; and a toothed crank, meshing with the toothed slider bar, having a crank pin that is braced in stationary fashion on the spindle head.

With a linear stroke drive train of this kind, linear stroke motions can be obtained, using a particularly simple design, with a motor arranged on the bracket. The rotary motion proceeding from the motor output shaft is first converted into a longitudinal motion of the toothed slider bar, which in turn is converted into a rotary motion of the toothed crank, the crank pin of which is braced against the spindle head. In this manner it is particularly easy to convert the rotary motion proceeding from the motor into a pure linear stroke motion without lateral offset. It is understood that the crank dimensions and the arrangement and spacing of the slots are selected to match the dimensions of the changer drive. By providing two slots it is possible to move the toothed slider bar in steps, in such a way that when a rotation of the motor output shaft is initiated, the crank pin first engages in the one slot and thus provides for a outward linear stroke motion of the tool holder; then an idle stroke occurs as the crank pin changes from the first slot to the second slot, during which time the changer motion can be completed; and when the crank pin engages into the second slot, the linear stroke drive train provides an inward spindle stroke.

According to a further preferred embodiment, the changer drive train of the common drive mechanism has a crank, joined non-rotatably to the associated output shaft of the motor, having a crank pin that engages into a slot of a slider bar which is incorporated into a belt or chain drive for the tool changer.

With a changer drive train of this kind, the drive force of the motor can be transferred to the tool changer using a particularly simple design. The rotary motion proceeding from the motor is converted into a translating motion, which in turn causes rotation of the belt or chain. The belt or chain can then pass around, for example, a drive gear of the tool changer, so that when the crank pin of the crank engages into the slot of the slider bar, the tool changer rotates.

It is preferred in this connection if the belt or chain drive has a toothed belt.

The advantage of this feature is that the drive force of the motor can be delivered without major design complexity even to (relatively speaking) more remote locations, even "around corners." This is particularly advantageous because the bracket carrying the common drive mechanism can thus be arranged at the front of the spindle head, and the drive force of the motor can be transferred to the tool changer arranged laterally on the spindle head.

According to a further preferred embodiment, the belt or chain drive has an adjustment mechanism.

With an adjustment mechanism of this kind it is particularly easy to set the zero point of the tool changer.

It is furthermore preferred if the slider bar is equipped with snap slots whose positions on the slider bar correspond to the magazine position and the spindle position of the tool changer.

Snap slots of this kind make it possible, with a particularly simple design, to provide for the tool holders held by the tool changer to be positioned accurately in each end position. This is particularly important because subsequent to the changer operation the linear stroke motion, by means of which the tool holder is introduced precisely into the tool receptacle of the spindle, is initiated.

According to a further preferred embodiment, the slots of the slider bar and the toothed slider bar are open slots having a depth corresponding to the radius of the respective cranks.

This feature makes it particularly easy to match the changer and linear stroke motions to one another. This is accomplished substantially by selecting suitable radii for the cranks, thus avoiding the need to equip the motor itself with a complicated drive train.

As already mentioned, the toothed slider bar preferably has two slots and the slider bar preferably one slot. Engagement of the respective cranks into these slots then occurs so that the changer and linear stroke motions immediately follow one another.

It is particularly preferred if the machine tool has two spindles and two tool changers associated with those spindles, which are driven by the same changer drive.

With a machine tool of this kind, machining of two workpieces can always be proceeding simultaneously. It is easy to drive both tool changers in parallel if, in particular, the changer drive has a toothed belt as mentioned above.

Further advantages are evident from the description and the attached drawings.

It is understood that the features mentioned above and those yet to be explained below can be used not only in the respective combinations indicated, but also in other combinations or in isolation, without leaving the context of the present invention.

BRIEF DESCRIPTION OF THE DRAWINGS

An embodiment of the invention is shown in the drawings and will be explained further in the description below. In the drawings.

DETAILED DESCRIPTION OF A PREFERRED EMBODIMENT

Figure 1:
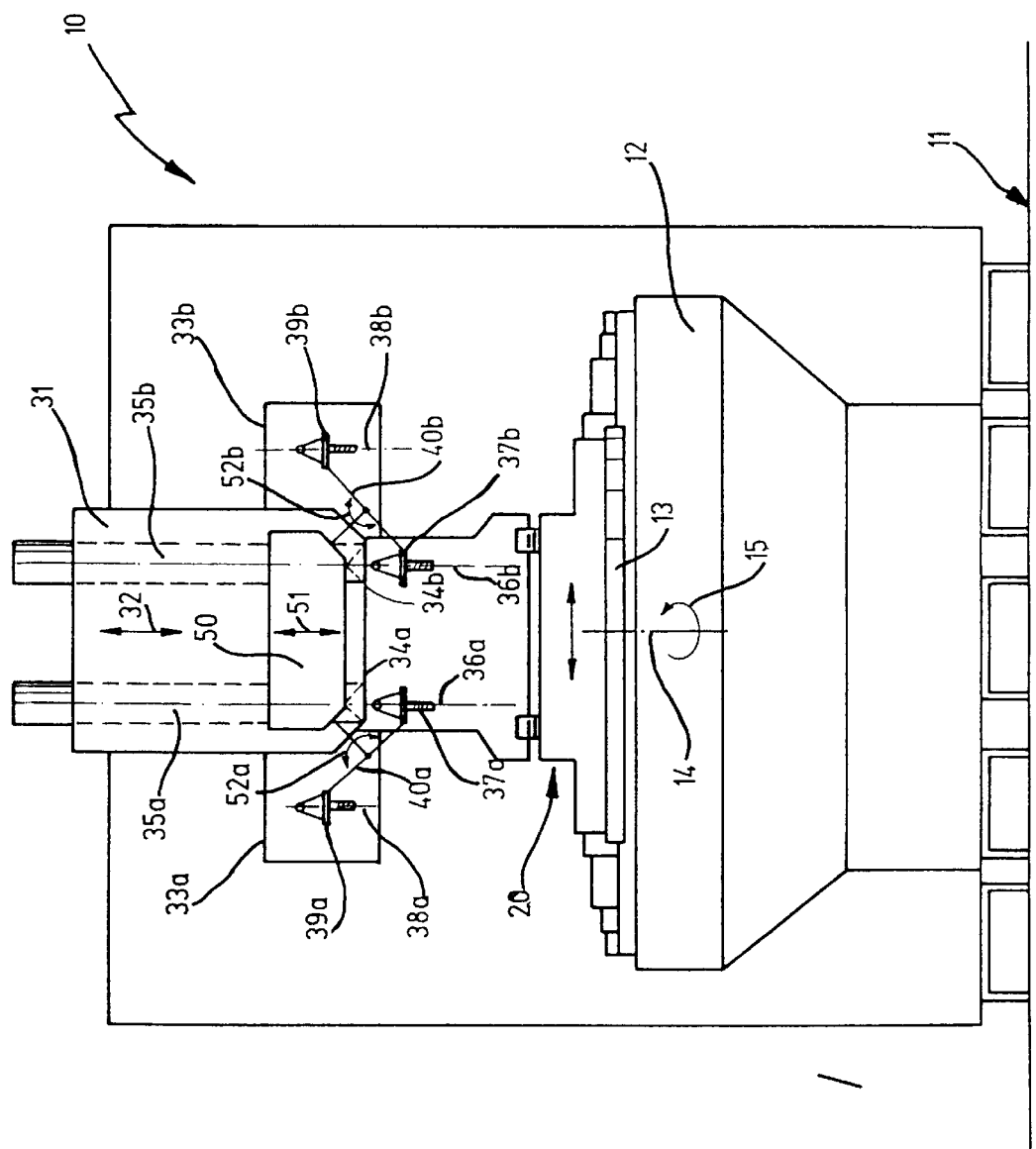
FIG. 1 shows a machine tool according to the invention in a front view, a common drive mechanism for two tool changers and one linear stroke mechanism being shown schematically.

In FIG. 1, 10 generally designates a machine tool that stands on a base 11. Machine tool 10 has a tool table 12 on which a workpiece changer 13 is arranged rotatably about an axis 14, as indicated by an arrow 15.

Machine tool 10 furthermore has a horizontal X-Y column 20, movable in the X and Y directions, on which is arranged a spindle head 31 that can be moved in the Z direction 32. Two tool magazines 33a, 33b are arranged laterally on spindle head 31.

Mounted rotatably in spindle head 31 are two spindles 35a, 35b, on whose vertical lower ends tool receptacles 34a, 34b to receive tool holders 37a, 37b, 39a, 39b are provided.

Provided laterally on spindle head 31 are two tool changers 40a, 40b, which can convey tool holders 39a, 39b, which are located in front of the corresponding tool magazines 33a, 33b in magazine positions 38a, 38b, into spindle positions 36a, 36b below spindles 35a, 35b. In a changing operation of this kind, tool holders 37a, 37b, located in spindle positions 36a, 36b, are conveyed simultaneously into magazine positions 38a, 38b.

Also arranged on spindle head 31, in vertically movable fashion as indicated by an arrow 51, is a common drive mechanism 50. The drive mechanism drives tool changers 40a, 40b as indicated schematically by arrows 52a, 52b. Tool changers 40a, 40b are mounted on common drive mechanism 50 so that after completion of the changing operation from magazine position 38a, 38b into spindle position 36a, 36b, tool holders can be lifted by means of a vertical motion of the common drive mechanism into tool receptacles 34a, 34b of spindles 35a, 35b, i.e. into their working position.

During this linear stroke operation by which tool holders 37a, 37b located in spindle position 36a, 36b are moved into tool receptacles 34a, 34b, tool holders 39a, 39b located in magazine position 38a, 38b are of course also lifted into a position in which they can be removed from the respective tool changer 40a, 40b and replaced by a tool holder from tool magazine 33a, 33b that is equipped with a tool for the next machining step.

It is understood that before any further changing operation, common drive mechanism 50 must first be lowered back down in order first to convey the tool holders located in tool receptacles 34a, 34b back into spindle position 36a, 36b.

Figure 2:
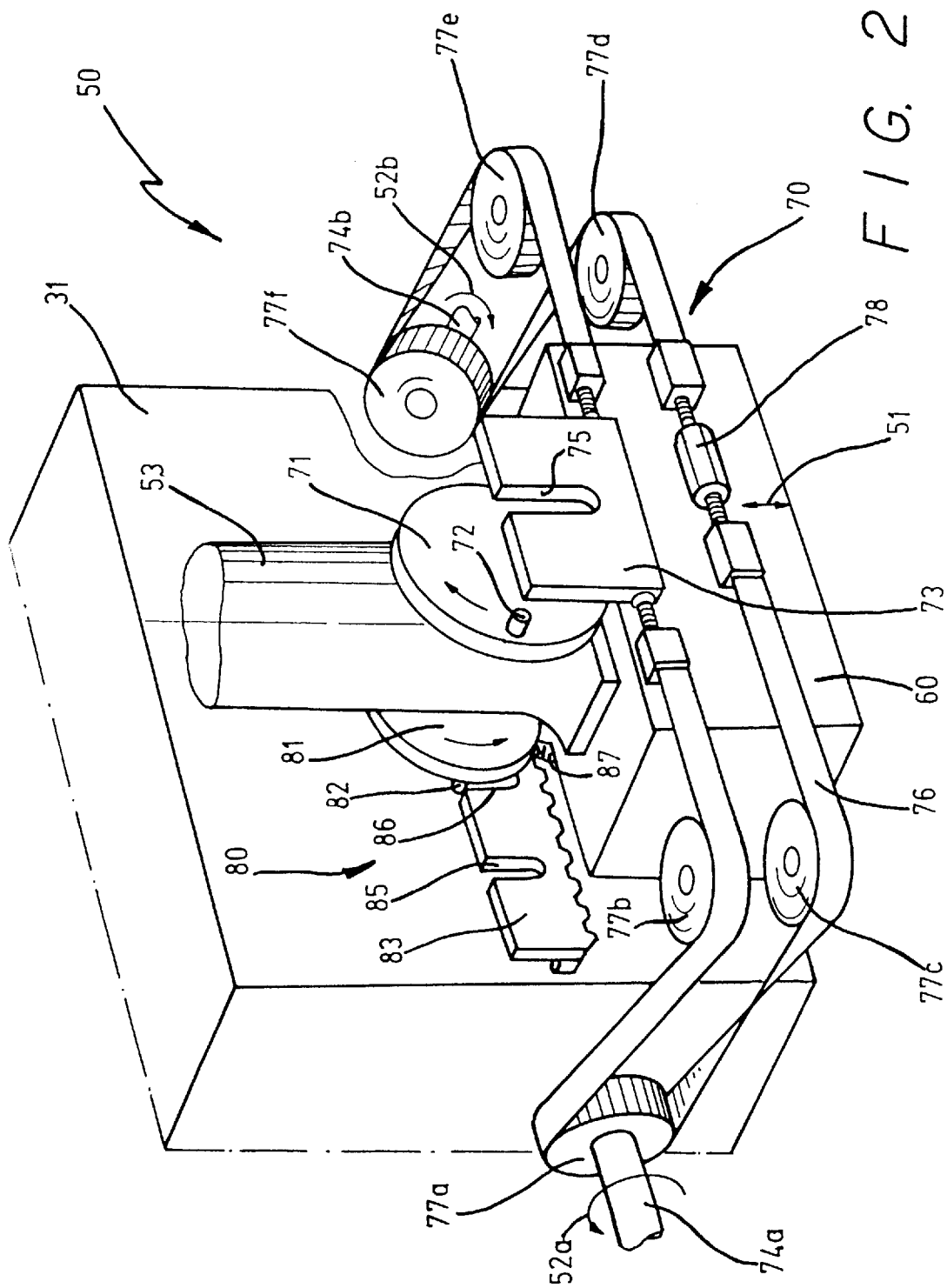
FIG. 2 shows a perspective view of an embodiment of a common drive mechanism for the tool changer and the linear stroke mechanism of the machine tool of FIG. 1.
Figure 3:
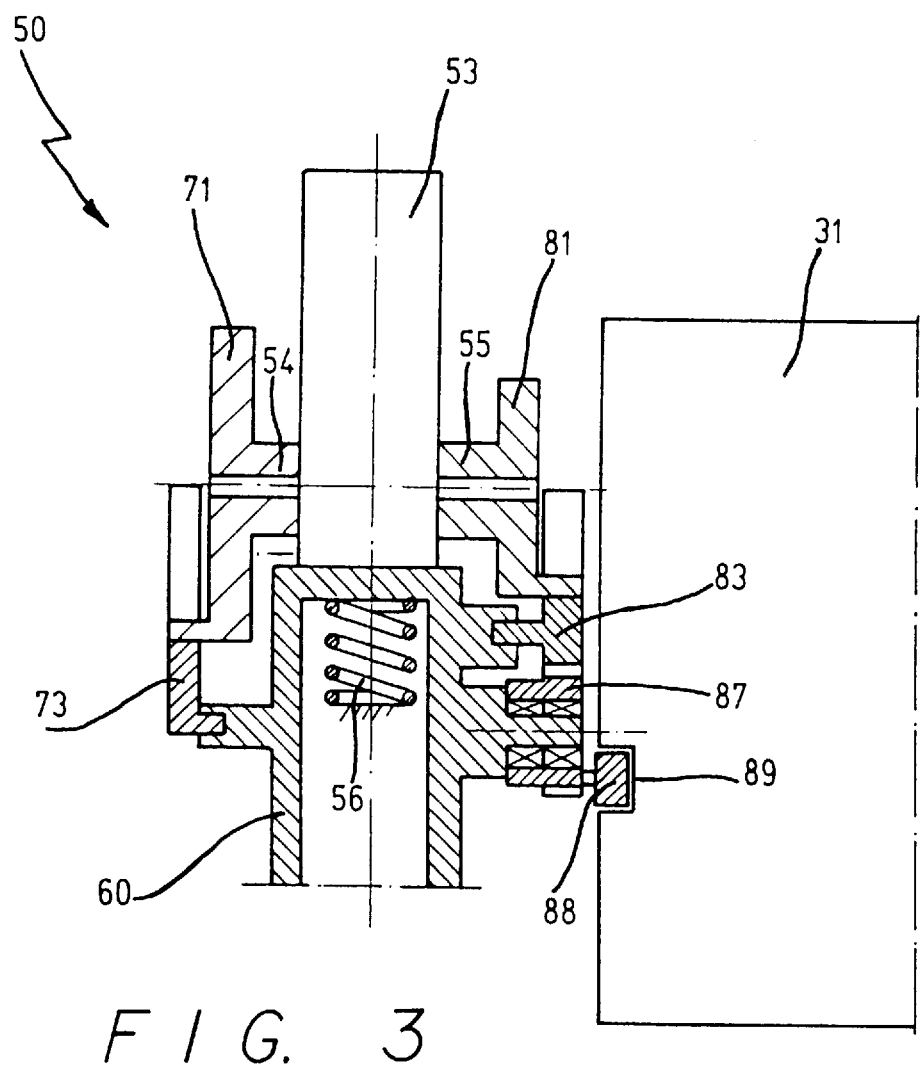
FIG. 3 shows a schematic side view through the drive mechanism of FIG. 2.

FIGS. 2 and 3 shown an embodiment of a common drive mechanism 50 of this kind.

Common drive mechanism 50 has a motor 53 that is fastened on a bracket 60 that, as indicated by arrow 51, is mounted so as to move vertically on spindle head 31. Motor 53 has two output shafts 54, 55 (not shown in FIG. 2), of which one 55 proceeds toward spindle head 31, and the other 54 away from spindle head 31. Tool changers 40a, 40b (not shown) are also fastened on bracket 60.

Common drive mechanism 50 furthermore has a changer drive 70 to drive the two tool changers 40a, 40b and a linear stroke drive 80 for vertical movement of bracket 60 on spindle head 31, which are drive-coupled to the output shafts of motor 53. Changer drive 70 and linear stroke drive 80 are constituted by a changer drive train 70 and a linear stroke drive train 80, respectively.

Changer drive train 70 has a crank 71, having a crank pin 72, that is nonrotatably joined to output shaft 54 of motor 53 that points away from spindle head 31. Changer drive train 70 further has a toothed belt drive having a toothed belt 76, a series of guide rollers 77a–77f, an adjustment mechanism 78 incorporated into the toothed belt in the form of a turnbuckle, and a slider bar 73 incorporated into toothed belt 76. Slider bar 73 has a slot 75 open toward the top, and is guided adjacent to crank 71 on bracket 60, so that its crank pin 72 can engage into slot 75. The depth of slot 75 corresponds approximately to the crank radius.

Guide rollers 77a–77f comprise four guide rollers 77b–77e configured as deflection rollers, which serve to deflect the continuous toothed belt 76 from a front section of spindle head 31 to its two sides. The end loops of toothed belt 76 thus constituted run around two further guide rollers 77a and 77f, which are tilted slightly with respect to the vertical and are joined nonrotatably to respective drive shafts 74a, 74b for tool changers 40a and 40b secured to bracket 60 on either side of spindle head 31. Although this is not shown in the drawings for the sake of clarity, it is understood that guide rollers 77a–77f are all mounted on bracket 60, and therefore also move along with linear stroke motions of bracket 60.

When crank pin 72 of crank 71 engages into slot 75 of slider bar 73 and thereby moves the latter transversely, the corresponding motion of toothed belt 76 imparts to drive shafts 74a, 74b a rotation to drive tool changers 40a, 40b. The zero point of tool changers 40a, 40b can be set using adjustment mechanism 78.

Linear stroke drive train 80 comprises a further crank 81, which is nonrotatably joined to drive shaft 55 of motor 53 facing toward spindle head 31 and has a crank pin 82. Mounted adjacent to crank 81, displaceable horizontally on bracket 60, is a toothed slider bar 83. Toothed slider bar 83 has two slots 85, 86 into which crank pin 82 of crank 81 can engage. The spacing of slots 85, 86 corresponds to the crank diameter of crank 81. Toothed slider bar 83 rests on a toothed crank 87 and meshes with it. Toothed crank 87 has a pin 88 (not shown in FIG. 2) which engages into a slot 89 in spindle head 31 and is vertically located by it.

When crank pin 82 engages into slot 85 or 86, toothed slider bar 83 is offset laterally. Because of the meshed engagement with toothed crank 87, the latter rotates about its vertically retained pin 88 so that bracket 60, with the parts fastened in it, is moved vertically up and down.

FIG. 3 schematically indicates a spring 56 that absorbs the dead weight of bracket 60 and the parts mounted on it so that linear stroke drive train 80 does not need to absorb such large forces.

Figure 4:
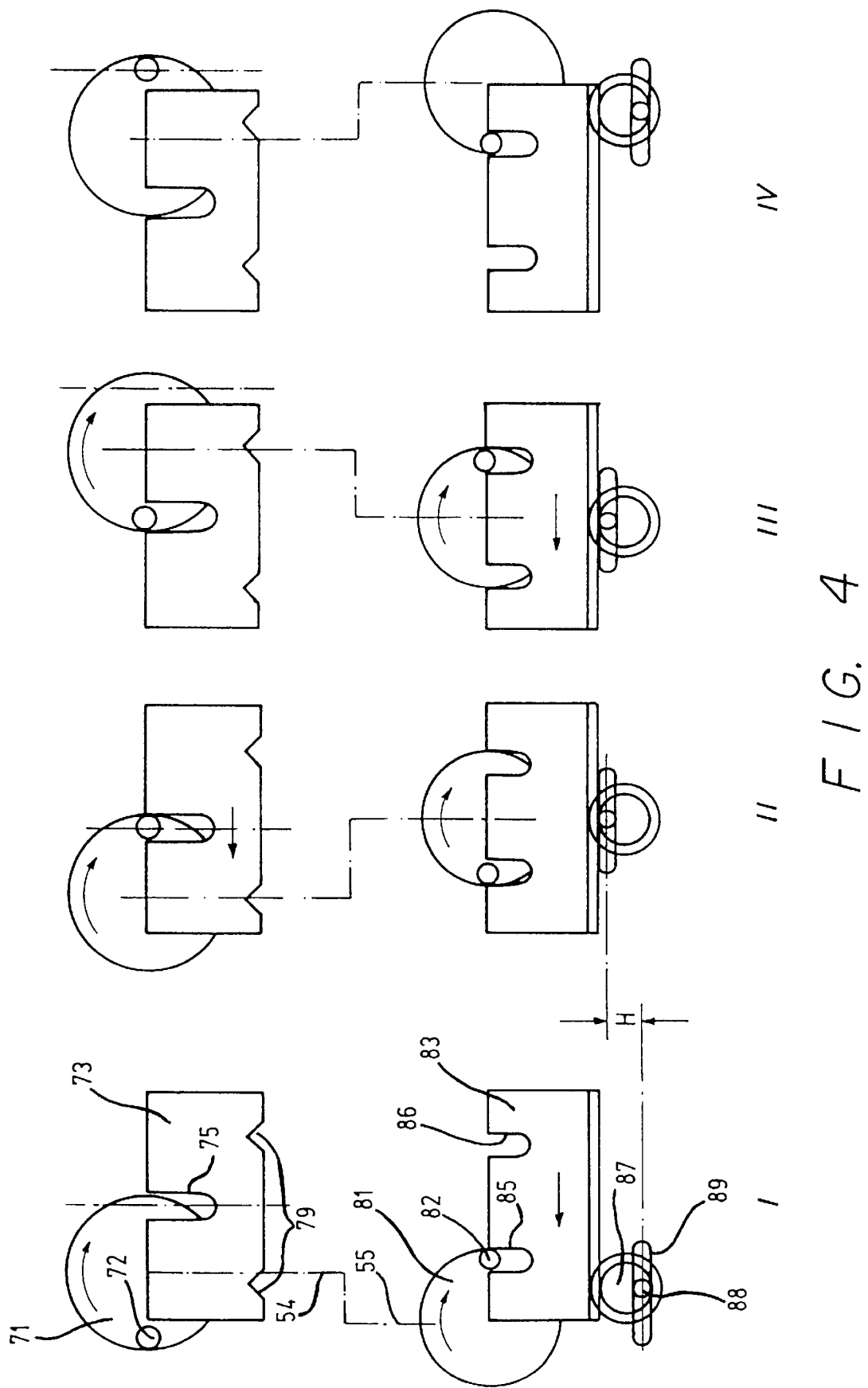
FIG. 4 shows a schematic illustration, in phases, of the drive sequences for the tool changing and linear stroke operations.

FIG. 4 shows, in phases I to IV, the drive sequence of common drive mechanism 50.

An initial position is shown in phase I. In a first working step from phase I to phase II, crank 71 performs an idle stroke through an angle of 180 degrees; i.e. no engagement into slot 75 of slider bar 73, and thus no rotation of tool changers 40a, 40b, takes place. In the same working step, crank 81 performs a rotation through 180 degrees; crank pin 82 thereby engages into slot 85 and thus offsets toothed slider bar 83 to the left in FIG. 4. As a result, toothed crank 87 rotates 180 degrees about its pin 88 in slot 89 of spindle head 31, which results in a linear stroke H corresponding to the crank diameter of toothed crank 87. In this first step, bracket 60 thus drops by a distance H, as a result of which the tool holders located in phase I in tool receptacles 34a, 34b of spindles 35a, 35b are lifted out of the latter.

In the next working step from phase II to phase III, crank 81 performs a 180-degree idle stroke, moving crank pin 82 from slot 85 to slot 86. A linear stroke motion therefore does not take place.

At the same time, an engagement of crank pin 72 into slot 75 of slider bar 73 takes place, causing the latter to be offset to the left in FIG. 4 and thus driving the two tool changers 40a, 40b. In phase III, tool holders 39a, 39b that previously (in phases I and II) were in magazine position 38a, 38b are therefore in spindle position 36a, 36b, and tool holders 37a, 37b that were previously used for workpiece machining are conveyed from spindle position 36a, 36b into magazine position 38a, 38b (cf. FIG. 1).

In the third working step from phase III to phase IV, crank 71 again performs an idle stroke so that tool changers 40a, 40b are not driven. At the same time, crank pin 82 of crank 81 engages into slot 86 of toothed slider bar 83, so that bracket 60 is raised again by a value H, with the result that the tool holders are moved from spindle position 36a, 36b into tool receptacles 34a, 34b of spindles 35a, 35b. A complete changing operation with two linear stroke motions and one tool changer rotation is thus performed. In the next tool changing operation, in which cranks 71, 81 are rotated in the opposite direction, the same steps are performed in the reverse sequence, i.e. from phase IV, to phase I, and so forth.

FIG. 4 indicates on slider bar 73 two snap slots 79, the positions of which on slider bar 73 correspond to the magazine position and spindle position. Snap means correspondingly provided in these positions can thus snap into slots 79 in order to immobilize tool changers 40a, 40b accurately in their respective end positions.

Figure 5:
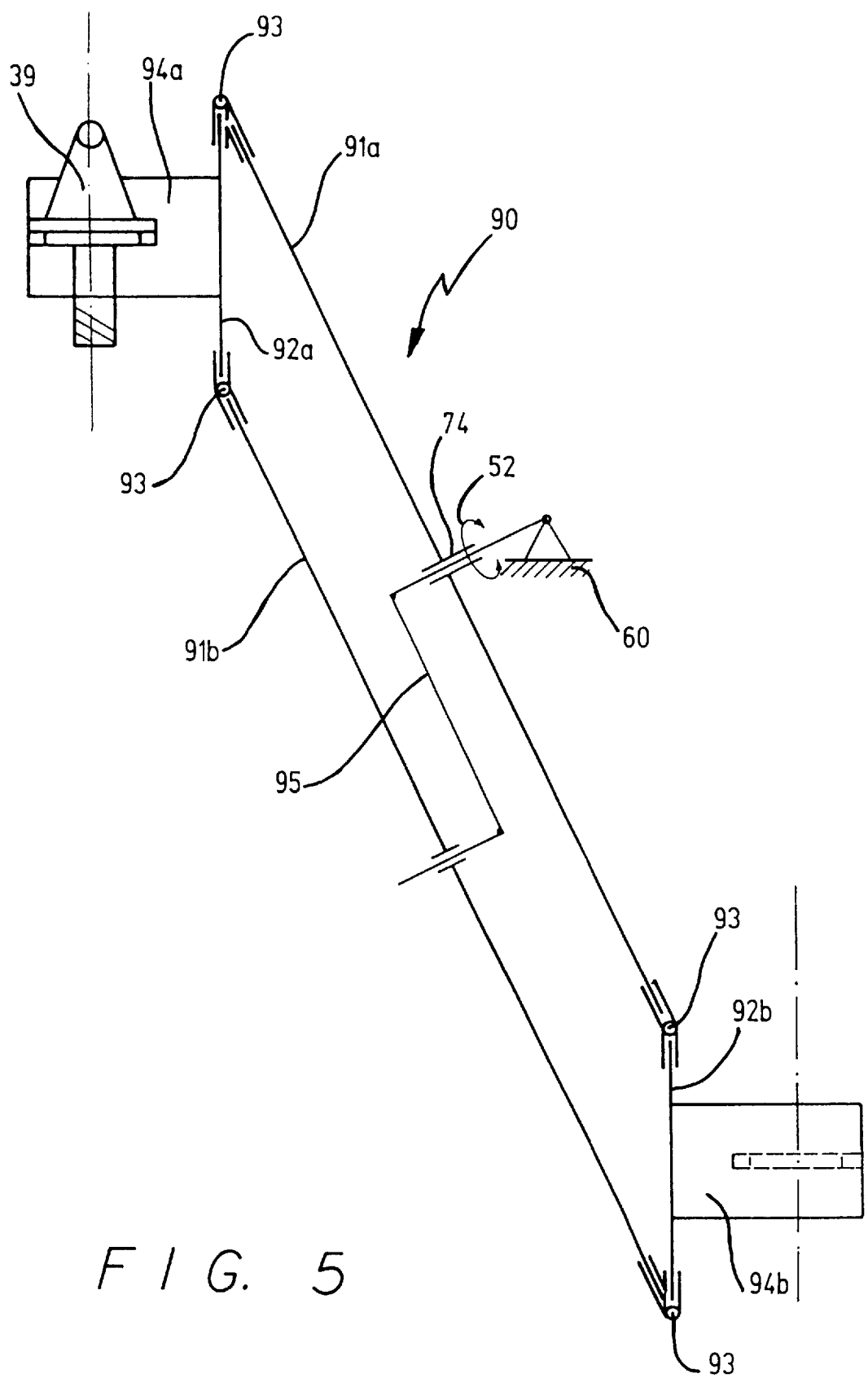
FIG. 5 shows a schematic side view of a tool changer driven with the common drive mechanism of FIG. 2.

Lastly, FIG. 5 schematically shows a tool changer, configured as a rotary drive train 90, fastened on bracket 60. The present invention is usable in particularly preferred fashion with a rotating tool changer 90 of this kind. Details of this tool changer 90 are described in a parallel application of the same applicant (attorney's document 1401P165), the entire content of which is hereby incorporated by reference.

Rotary drive train 90 consists substantially of two longitudinal rods 91a, 91b and two transverse rods 92a, 92b that are joined by means of universal joints 93 into an articulated parallelo- gram.Longitudinal rods 91a, 91b are each mounted in the middle rotatably on a stationary coupling device 95. Fastened on transverse rods 92a, 92b are grippers 94a and 94b, respectively, which are design to grip tool holders 37, 39 in the transfer positions and hold them securely during a changing operation.

A changing operation is initiated by a rotation of the tilted drive shaft 74, causing longitudinal rods 91a, 91b to rotate about shafts constituted by coupling device 95. Because of universal joints 93, transverse rods 92a, 92b remain substantially vertically oriented.

A 180-degree rotation of drive shaft 74 and thus of longitudinal rods 91a, 91b corresponds to the motion of toothed belt 76 generated by slider bar 73 from phase II to phase III.

I claim:

1. A machine tool comprising:
   a spindle having a tool receptacle for receiving tool holders in their working position;
   a tool changer for conveying a tool holder in a first changing step between a magazine position and a spindle position at said spindle;
   a linear stroke mechanism for conveying a tool holder in a second changing step between said spindle position and said working position;
   a common drive mechanism linked to said tool changer and said linear stroke mechanism such as to effect both said first and second changing steps;
   wherein the common drive mechanism comprises a changer drive linked to the tool changer, a linear stroke drive linked to the linear stroke mechanism and a motor having two output shafts, a first output shaft being drive-coupled to said changer drive and a second output shaft being drive-coupled to said linear stroke drive.

2. The machine tool of claim 1, wherein the changer drive is configured as a changer drive train.

3. The machine tool of claim 2, wherein the linear stroke drive is configured as a linear stroke drive train, said changer drive train and linear stroke drive train being matched to one another in such a way that changer motions and linear stroke motions directly follow one another.

4. The machine tool of claim 2, wherein the changer drive train of the common drive mechanism has a crank that is joined nonrotatably to the associated output shaft of the motor and comprises a crank pin that engages into a slot of a slider bar which is incorporated into a belt or chain drive for the tool changer.

5. The machine tool of claim 4, wherein the belt or chain drive has a toothed belt.

6. The machine tool of claim 4, wherein the belt or chain drive has an adjustment mechanism.

7. The machine tool of claim 4, wherein the slider bar is equipped with snap slots whose positions on the slider bar correspond to the magazine position and the spindle position of the tool changer.

8. The machine tool of claim 4, wherein the slot of the slider bar is an open slot having a depth corresponding to the radius of said crank.

9. The machine tool of claim 1, wherein the linear stroke drive is configured as a linear stroke drive train.

10. The machine tool of claim 9, wherein the linear stroke drive train of the common drive mechanism has a crank provided with a crank pin and joined nonrotatably to the associated output shaft of said motor, a toothed slider bar having two slots into which said crank pin alternatively engages, and a toothed crank that meshes with the toothed slider bar and comprises a crank pin that is braced in stationary fashion to the spindle head.

11. The machine tool of claim 10, wherein the slots of the toothed slider bar are open slots having a depth corresponding to the radius of said crank.

12. The machine tool of claim 1, wherein the common drive mechanism and the tool changer are arranged on a bracket that is movable parallel to the linear stroke direction.

13. The machine tool of claim 12, wherein the linear stroke drive of the common drive mechanism is mounted displaceably in the linear stroke direction on a spindle head, and is braced, for linear stroke motions, against said spindle head.

14. The machine tool of claim 12, wherein the bracket is braced in spring-compensated fashion against the spindle head.

15. The machine tool of claim 1, comprising two spindles and two tool changers associated with said two spindles, both tool changers being driven by the same changer drive.

* * * * *